United States Patent
Biggs et al.

(10) Patent No.: US 8,104,819 B2
(45) Date of Patent: Jan. 31, 2012

(54) AUDIO BRACKET FORE AND AFT SLIP PLANE

(75) Inventors: Christopher Biggs, Farmington Hills, MI (US); Nicholas Spitler, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 816 days.

(21) Appl. No.: 11/741,276

(22) Filed: Apr. 27, 2007

(65) Prior Publication Data

US 2008/0265607 A1 Oct. 30, 2008

(51) Int. Cl.
*B60K 37/04* (2006.01)
(52) U.S. Cl. .................................................. 296/72
(58) Field of Classification Search ............. 296/72; 248/309.1; 29/469; 411/427
See application file for complete search history.

(56) References Cited

U.S. PATENT DOCUMENTS

| | | | |
|---|---|---|---|
| 803,356 A * | 10/1905 | Patterson | 296/72 |
| 5,181,435 A * | 1/1993 | Khalifa et al. | 74/492 |
| 5,429,412 A * | 7/1995 | Schoen et al. | 296/29 |
| 5,564,769 A | 10/1996 | Deneau et al. | |
| 5,884,875 A | 3/1999 | Hanada et al. | |
| 6,481,786 B1 * | 11/2002 | Kim | 296/203.02 |
| 6,517,145 B2 * | 2/2003 | Hedderly | 296/192 |
| 6,523,878 B2 * | 2/2003 | Scheidel | 296/70 |
| 6,554,352 B2 * | 4/2003 | Nagy | 296/203.02 |
| 6,581,967 B1 * | 6/2003 | Logan et al. | 280/779 |
| 6,736,439 B2 * | 5/2004 | Yasuta et al. | 296/72 |
| 6,843,521 B1 * | 1/2005 | Oana | 296/70 |
| 7,237,831 B2 * | 7/2007 | Yamamoto et al. | 296/193.04 |
| 7,367,613 B2 * | 5/2008 | Ellison et al. | 296/193.02 |
| 2003/0146350 A1 * | 8/2003 | Nakajima | 248/27.1 |
| 2003/0160134 A1 * | 8/2003 | Upson et al. | 248/27.3 |
| 2005/0001105 A1 * | 1/2005 | Matsuda et al. | 248/27.1 |
| 2005/0029409 A1 * | 2/2005 | Tagle | 248/27.1 |

FOREIGN PATENT DOCUMENTS

| | | | | |
|---|---|---|---|---|
| JP | 2000025652 A | * | 1/2000 | |
| JP | 2005132251 A | * | 5/2005 | |
| JP | 2008290508 A | * | 12/2008 | |
| WO | WO0185529 | | 11/2001 | |

* cited by examiner

*Primary Examiner* — H Gutman
(74) *Attorney, Agent, or Firm* — Young Basile Hanlon & MacFarlane, P.C.

(57) ABSTRACT

An automotive audio bracket for mounting a vehicle component to an interior surface of the vehicle includes a first mounting surface oriented substantially perpendicular to the interior surface and adapted for attachment to a rigid support structure of the vehicle, and a second mounting surface oriented substantially perpendicular to the interior surface and adapted for attachment to the vehicle component. An elongated aperture extends through one of the first and second mounting surfaces, the aperture being elongated along an axis substantially perpendicular to the interior surface. A fastening mechanism is positioned within the aperture and connects the first mounting surface to the second mounting surface.

24 Claims, 4 Drawing Sheets

AUDIO BRACKET FORE AND AFT SLIP PLANE

FIELD OF THE INVENTION

The present invention relates in general to an automotive mounting bracket and more particularly, to an audio bracket having a fore and aft slip plane.

BACKGROUND

Conventional automotive vehicles typically consists of thousands of individual components connected together to form a complete vehicle. To streamline and minimize the cost associated with assembling a vehicle, manufacturers may construct subassemblies consisting of various components. Each subassembly is then attached to the vehicle as part of the final assembly. An instrument panel assembly is one such subassembly. The instrument panel assembly may include an instrument panel to which various know components, such an instrument cluster, vehicle controls, stereo system, glove compartment, ventilation system, among others, are attached. The instrument panel assembly may also include a rigid cross-car support to which the instrument panel is attached. When the instrument panel assembly is installed in the vehicle, the ends of the cross-car support are appropriately coupled to a substructure of the vehicle, such as the A-pillars, thereby insuring that the instrument panel is properly positioned and fixed for use.

Some of the components attached to the instrument panel, such as the stereo system, can be rather heavy. Attaching heavy components such as this to the instrument panel without additional support can result in the component vibrating when the vehicle is operated, particularly over rough road surfaces. This in turn can cause undesirable noise, vibration and harshness (NVH), which can negatively impact the perceived quality of the vehicle. To avoid this problem, heavy components, such as the stereo system, are often secured to a rigid body member, such as the cross-car support, in addition to the instrument panel. Attaching the component to both the instrument panel and the cross-car support, however, can cause assembly problems, such as mounting holes being misaligned, due to the compounding of manufacturing tolerances, particularly in the forward to aft dimensions. One method for alleviating this problem is to decrease the manufacturing tolerances of the various components, which unfortunately, may result in an undesirable increase in the manufacturing cost of the vehicle. Because of these and other known limitations of existing methods for connecting instrument panel components to multiple support structures, it is desirable to develop a relatively simple and cost effective means for securely mounting a vehicle component to the instrument panel assembly that is capable of accommodating manufacturing tolerances that would otherwise make assembly of the components difficult.

SUMMARY

An automotive audio bracket is provided for mounting a vehicle component to an interior surface of the vehicle, The bracket including a first mounting surface oriented substantially perpendicular to the interior surface and adapted for attachment to a rigid support structure of the vehicle, and a second mounting surface oriented substantially perpendicular to the interior surface and adapted for attachment to the vehicle component. An elongated aperture extends through one of the first and second mounting surfaces, the aperture being elongated along an axis substantially perpendicular to the interior surface. A fastening mechanism is positioned within the aperture and connects the first mounting surface to the second mounting surface.

BRIEF DESCRIPTION OF THE DRAWINGS

The audio bracket disclosed herein will become more fully understood from the detailed description and accompanying drawings, wherein.

DETAILED DESCRIPTION

The following description of the embodiments is merely exemplary in nature and is in no way intended to limit the invention, its application, or uses.

Figure 1:
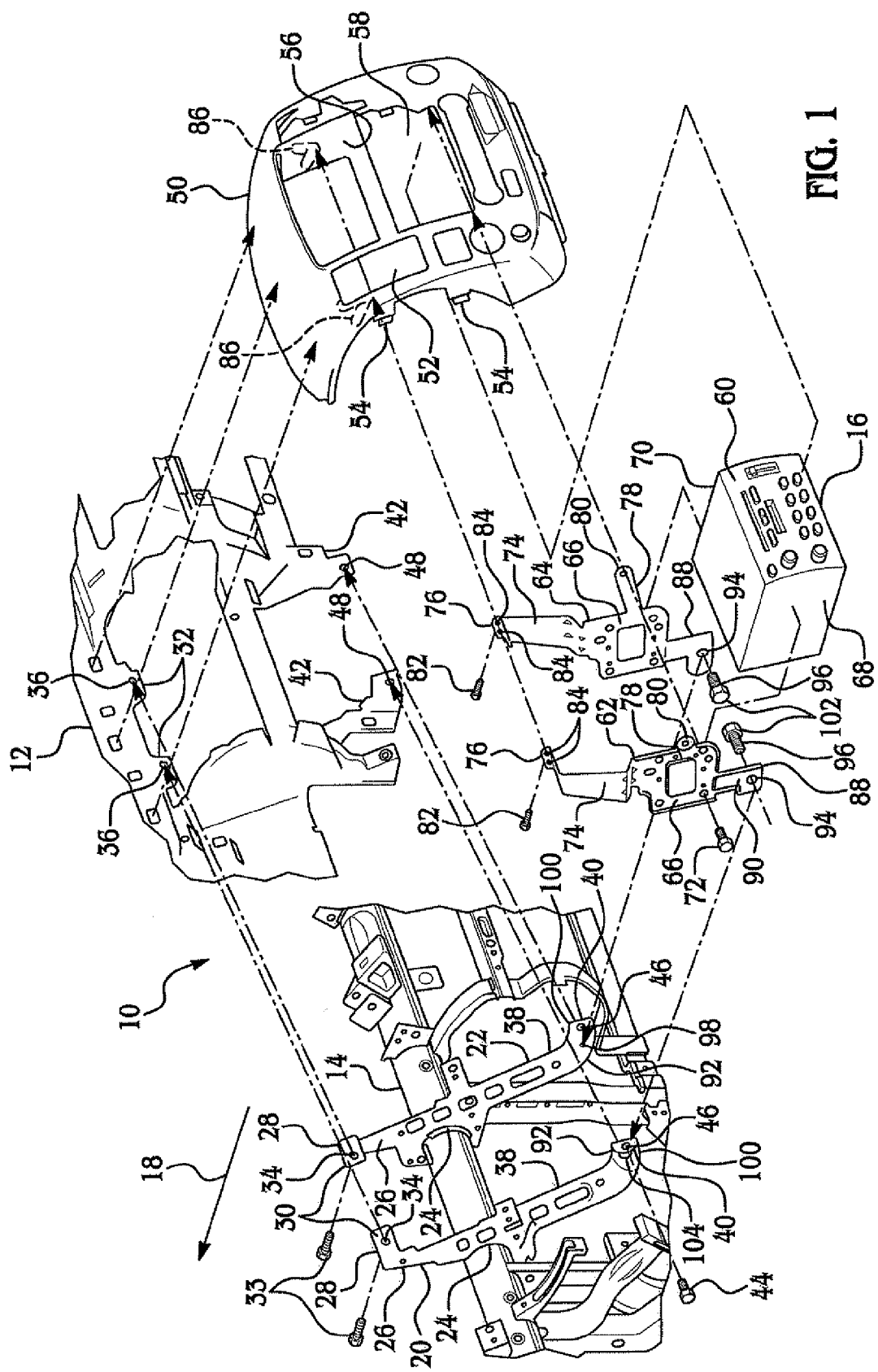
FIG. 1 is an exploded perspective view of an automotive instrument panel assembly employing an audio bracket having a fore and aft slip plane.
Figure 2:
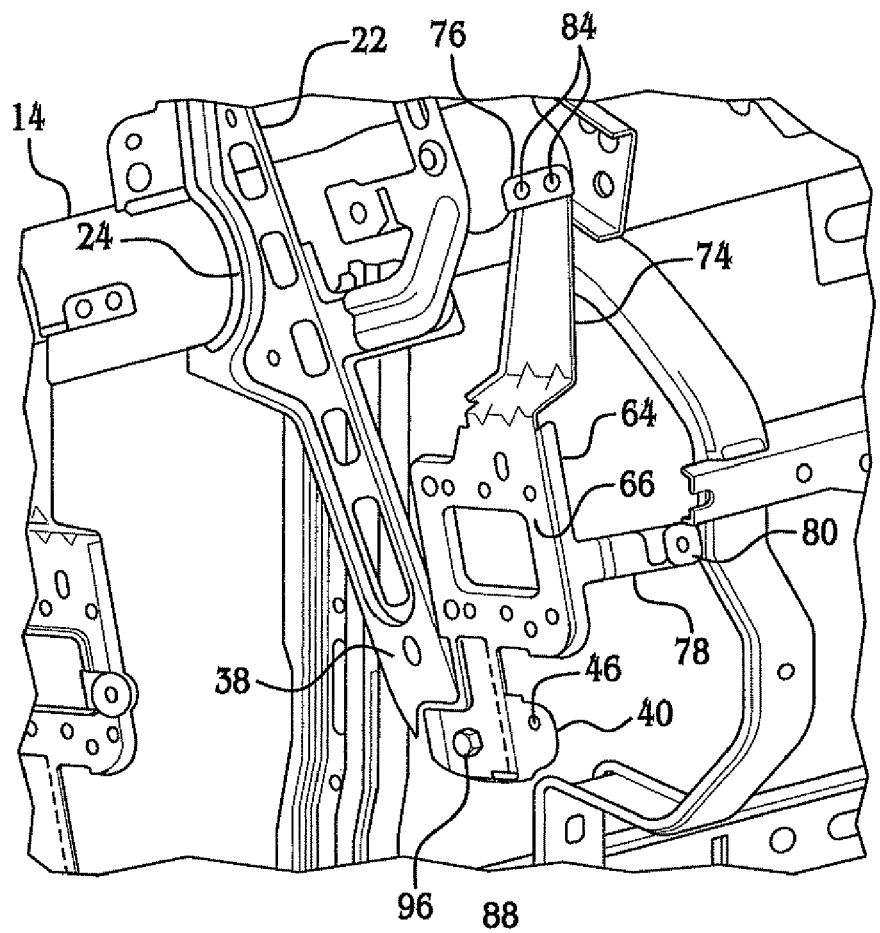
FIG. 2 is a partial perspective view of the instrument panel assembly of FIG. 1, showing the audio bracket attached to an instrument panel bracket.
Figure 3:
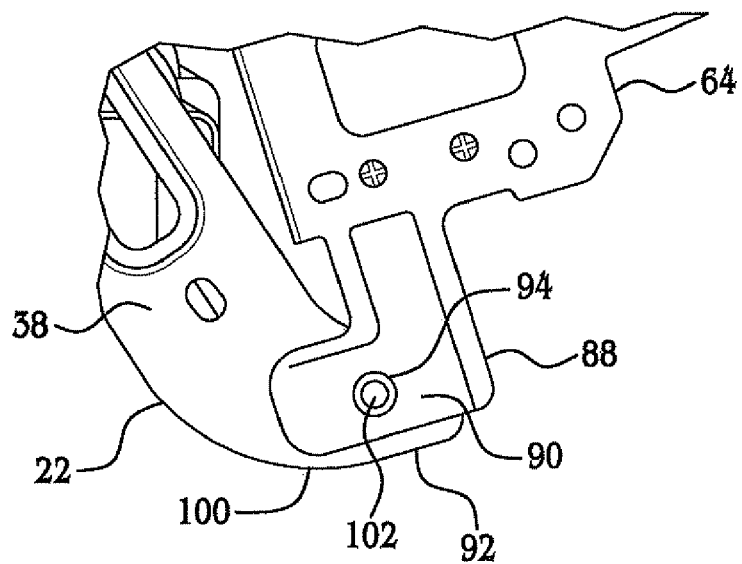
FIG. 3 is a partial side elevational view of the connection between the audio bracket and the instrument panel bracket, as shown in FIG. 2, with a fastener for connecting the two components removed for clarity.

Referring to FIGS. 1-3, an instrument panel assembly 10 mountable within a passenger a compartment of an automotive vehicle is shown. Instrument panel assembly 10 extends in a cross-vehicle direction at the front of the passenger compartment below a front windshield of the vehicle. Instrument panel assembly 10 may include an instrument panel 12 and an elongated rigid steering member 14 disposed within instrument panel 12. Steering member 14 provides rigid support for a steering column and a plurality of components or instruments associated with instrument panel 12, such as an audio unit 16, as well as other components, including but not limited to, wiring, duct work, an instrument cluster, and a passenger air bag.

Instrument panel 12 may be constructed of a variety and materials, which may include a relatively stiff, self supporting, thermoplastic having limited flexibility and capable of being molded to a desired configuration. Instrument panel 12 includes appropriate openings for receiving various components, such as the air ducts, instrument cluster, cabin climate control module, and audio unit 16, among others.

Steering member 14 extends in a cross-vehicle direction generally perpendicular to a lengthwise axis 18 of the vehicle. Opposite ends of steering member 14 are preferably fixedly coupled to a rigid portion of the vehicle substructure, such as the vehicle's A-pillars, using a variety of known attaching means. Steering member 14 may be constructed as a hollow tube and have any of a variety of cross-sectional shapes, such as polygonal, circular, and oblique, depending on the specific requirements of the particular application.

Hardware rigidly mounted to steering member 14 includes a pair of spaced apart elongated IP mounting brackets 20 and 22 for attaching instrument panel 12 to steering member 14. IP mounting brackets 20,22 may be welded or otherwise secured to steering member 14 along a midsection 24 of the respective bracket. IP mounting brackets 20,22 include an upper arm 26 extending in a generally upward direction from steering member 14. Extending from a distal end 28 of upper arm 26 is a mounting flange 30 adapted to engage an upper region 32 of instrument panel 12. Instrument panel 12 may be secured to brackets 22, 24 by means of a threaded faster 33 that engages an aperture 34 in flange 30 and a corresponding threaded aperture 36 in instrument panel 12.

IP brackets 20,22 also include a lower arm 38 extending in a generally downward direction from steering member 14. Extending from a distal end of lower arm 38 is a flange 40, which engages a lower region 42 of instrument panel 12. Instrument panel 12 may be secured to brackets 20,22 by means of a threaded fastener 44 that engages an aperture 46 in flange 40 and a corresponding threaded aperture 48 in instrument panel 12.

Instrument panel assembly 10 further includes a bezel 50 that connects to instrument panel 12. Bezel 50 includes multiple openings for receiving various components, such as air conditioning ducts 52, audio unit 16, and cabin climate system controls, among others. Bezel 50 may be constructed from various materials and may include various configurations depending on the structural and aesthetic requirements of the particular application. Bezel 50 may be suitably attached to instrument panel 12 by means of integrally formed clips 54, screws, or any other suitable connecting means, Various components can be mounted to bezel 50 prior to attaching the bezel to instrument panel 12, including audio unit 16. Audio unit 16 can be mounted to a back inside surface 56 of bezel 50 relative to an opening 58 in bezel 50 so as to enable a front control panel 60 of audio unit 16 to be accessed through the bezel opening. Opening 58 in bezel 50 preferably has an edge contour that closely coincides with the adjoining surface contour of front control panel 60 of audio unit 16 to provide a gap free and aesthetically pleasing fit between audio unit 16 and bezel 50.

Audio unit 16 may be attached to bezel 50 by means of a pair of audio brackets 62 and 64. Audio brackets 62,64 have a generally planar midsection 66 that engages a vertical side surface 68 and 70, respectively, of audio unit 16, and may be attached thereto using one or more threaded fasteners 72. Alternatively, audio brackets 62,64 may be attached to audio unit 16 using another suitable connecting means, for example and without limitation, by welding, brazing, and rivets. Extending in generally upward direction from midsection 66 of audio brackets 62,64 is an upper arm 74 having a flange 76 adapted to engage the back inside surface 56 of bezel 50. Audio brackets 62,64 also include a lower arm 78 having a flange 80 adapted for engaging back inside surface 56 of bezel 50. Arm 78 extends in a generally rearward direction from midsection 66 of audio brackets 62,64 (i.e., toward a rear of the vehicle). Audio brackets 62,64 can be suitably attached to bezel 50 using threaded fasteners 82, which pass through an aperture 84 formed in flange 76, and threadably engage a corresponding threaded aperture 86 in bezel 50.

A conventional audio unit may include multiple audio components integrated into a single unit, such as a CD player, cassette tape player, and a radio receiver. This can result in the audio unit having a rather substantial weight. The substantial mass of the audio unit generally requires that it be securely affixed to a rigid portion of the vehicle structure, in addition to the instrument panel, to limit excessive vibration of the audio unit when operating the vehicle, particularly over rough road surfaces. Mounting audio unit 16 only to bezel 50 in the manner described above, wherein the audio unit is essentially cantilevered from the bezel, may have the undesirable effect of allowing the audio unit to vibrate in a generally vertical direction when the vehicle is operated. This could produce objectionable noise, vibrations, and harshness (NVH) that may negatively impact the perceived quality of the vehicle. To help minimize audio unit related NVH, audio unit 16 may also be attached to a rigid structural element of the vehicle, for example, steering member 14, in addition to bezel 50. This has an advantage of increasing the vertical stiffness of the audio unit mounting structure, which in turn can minimize vibration of the audio unit and the associated NVH.

Audio unit 16 can be affixed to steering member 14 by connecting audio brackets 62 and 64 to instrument panel brackets 20 and 22, respectively. Audio brackets 62,64 may include a mounting flange 88 extending in a generally downward direction from midsection 66 of brackets 62,64. Flange 88 includes a generally planar region 90 that overlays an end portion 92 of IP mounting brackets 20,22. It is preferable that planar region 90 of flange 88 be aligned substantially parallel to the lengthwise axis of the vehicle. An aperture 94 for receiving a threaded fastener 96 extends through planar region 90 of flange 88, the axis of aperture 94 being aligned substantially perpendicular to the vehicle lengthwise axis. A corresponding aperture 98 for receiving fastener 96 is located in an end 100 of IP mounting brackets 20,22. Flange 88 of audio brackets 62,64 may be secured to IP mounting brackets 20,22, respectively, using thread fasteners 96, which includes a bolt 102 and a nut 104. To assist with assembly, nut 104 may be fixedly attached to either the audio bracket or the IP mounting bracket (as shown in FIG. 1).

Preferably, aperture 94 in flange 88 will substantially align with aperture 98 in IP brackets 20,22 during assembly. However, due to manufacturing tolerances, that may not always be the case. Instances where the two apertures fail to lineup during assembly can generally be remedied by applying a force to an edge of flange 88 to urge the two apertures into alignment. This technique, however, can cause other components of instrument panel assembly 10 to become misaligned depending on the amount of force required to bring the two apertures into alignment. For example, bezel 50, which is directly connected to audio brackets 62,64, could potentially be moved out of position relative to instrument panel 12, thereby creating an undesirable gap between the mating surfaces of the two components.

To accommodate the inherent manufacturing tolerances effecting alignment of aperture 94 of audio brackets 62,64 with aperture 98 of IP mounting brackets 20,22, one or both apertures may be sized sufficiently larger than a major diameter of bolt 102, as shown in FIG. 3. Thus for example, if bolt 102 has a major diameter of 0.250 inches, and one of the apertures has a diameter of 0.300 inches, this would allow for a total misalignment of 0.050 inches between the two apertures. Although both apertures can be enlarged, doing so will not increase the amount of misalignment that can be accommodated, since the maximum allowable misalignment is the difference between the diameter of the larger of the two apertures and the major diameter of bolt 102.

Figure 4:
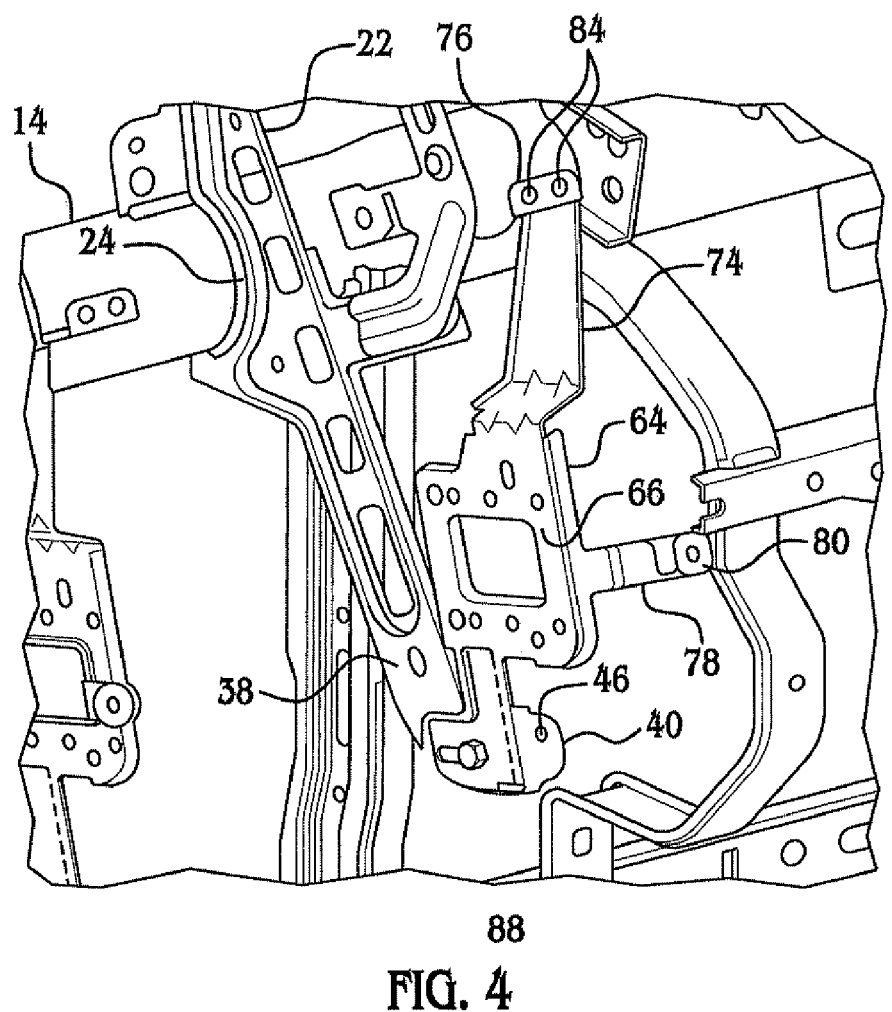
FIG. 4 is a partial perspective view of the instrument panel assembly showing the audio bracket employing an elongated aperture for receiving the fastener used to connect the audio bracket to the instrument panel bracket.
Figure 5:
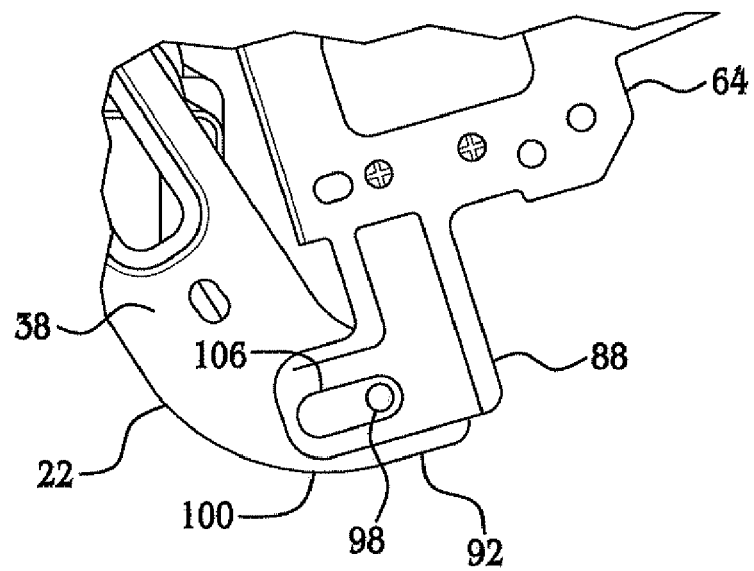
FIG. 5 is a partial side elevational view of the connection between the audio bracket and the instrument panel bracket, as shown in FIG. 4, with the fastener removed for clarity.

Referring to FIGS. 4 and 5, another means for accommodating potential misalignment of apertures 94 and 98 during assembly, includes providing an elongated slot 106 in flange 88 of audio brackets 62,64. This configuration allows for a substantially greater amount of misalignment than simply enlarging aperture 94 or aperture 98.

Figure 6:
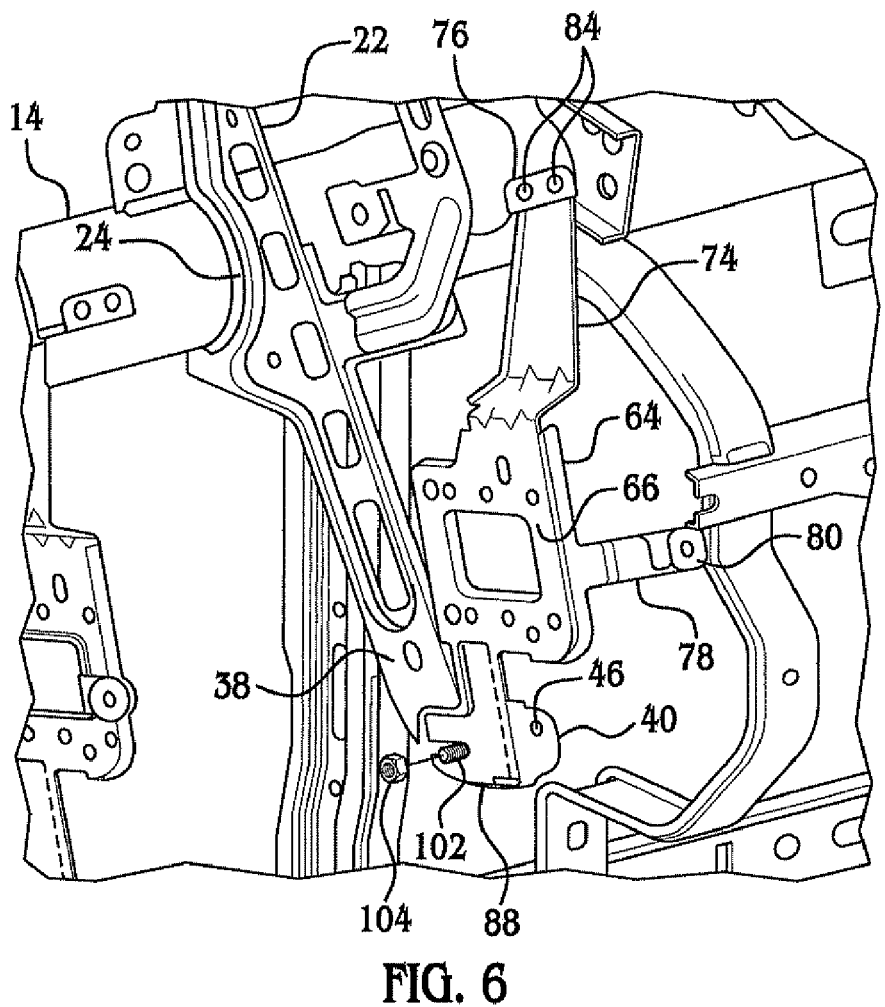
FIG. 6 is a partial perspective view of the instrument panel assembly showing the audio bracket employing a modified elongated aperture for receiving the fastener used to connect the audio bracket to the instrument panel bracket.
Figure 7:
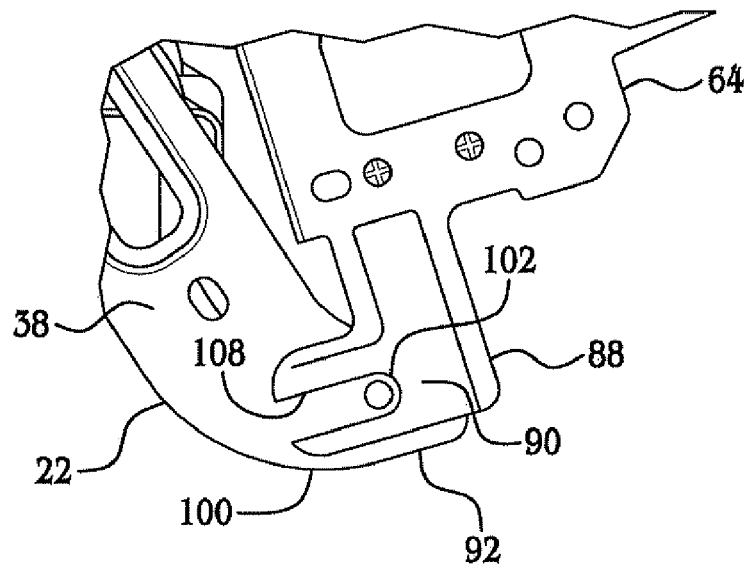
FIG. 7 is a partial side elevational view of the connection between the audio bracket and the instrument panel bracket.

Referring to FIGS. 6 and 7, another means for accommodating potential misalignment of apertures 94 and 98 during assembly, includes providing an elongated slot 108 in flange 88 of audio brackets 62,64. This configuration also allows for a substantially greater amount of misalignment than simply enlarging aperture 94 or aperture 98. This configuration will also enable bolt 102 to be fixedly attached to IP brackets 20,22, such as by welding or brazing, thereby forming a stud to which flange 88 of audio brackets 62,64 can be connected. During assembly, flange 88 is slid onto bolt 102 and nut 104 is threadably engaged with bolt 102, thereby securing audio brackets 62,64 to IP mounting brackets 20,22, respectively. It shall also be appreciated that positioning of bolt 102 and slot 108 may be reversed, wherein bolt 102 can be fixedly attached to audio brackets 62,64, and slot 108 can be formed in end 100 of IP mounting brackets 20,22.

The description of the invention is merely exemplary in nature, and thus, variations that do not depart from the gist of the invention are intended to be within the scope of the invention. Such variations are not to be regarded as a departure from the spirit and scope of the invention.

What is claimed is:

1. An assembly for a vehicle, comprising:
   an instrument panel having an interior surface of a passenger compartment of the vehicle;
   a rigid body element extending substantially parallel to the interior surface, from which extends a first mounting surface oriented substantially perpendicular to the interior surface;
   an object mounted to the interior surface so that at least a portion of the object is accessible from the passenger compartment of the vehicle; wherein at least one edge of the object touches an edge of the interior surface along at least one predetermined trim line;
   a bracket having a second mounting surface oriented substantially perpendicular to the interior surface and directly attached to the object so that the second mounting surface is positioned in an alignment zone relative to the first mounting surface; and
   a fastening mechanism attaching first mounting surface and second mounting surface and including a first aperture extending through one of the first mounting surface and second mounting surface in a position spaced from and below the rigid body member and the object, the first aperture being of a size larger than a required size to receive the fastening mechanism, wherein the fastening mechanism is positioned below the object.

2. The assembly of claim 1, wherein the first aperture extends through the first mounting surface, a second aperture extends through the second mounting surface; and the fastening mechanism comprises a bolt that extends through the first and second apertures when the second mounting surface is in the alignment zone.

3. The assembly of claim 1, wherein the first aperture extends through the second mounting surface, a second aperture extends through the first mounting surface; and the fastening mechanism comprises a bolt that extends through the first and second apertures when the second mounting surface is in the alignment zone.

4. The assembly of claim 1, wherein the fastening mechanism comprises a stud extending from one of the first mounting surface and second mounting surface, the stud being sized to through the first aperture when the second mounting surface is in the alignment zone.

5. The assembly of claim 1, wherein the fastening mechanism comprises a nut and a threaded member, wherein the nut is secured to the threaded member with a torque that is below a predetermined value selected to permit the first and second mounting surfaces to move relative to each other when the object is struck in the vehicle during a collision.

6. The assembly of claim 1, wherein the object comprises one of a radio, HVAC controller, user-actuated switch, and navigation screen.

7. The assembly of claim 1, wherein the first and second mounting surfaces are in facing engagement when coupled by the fastening mechanism.

8. The assembly of claim 1, wherein the rigid body element comprises a cross car member, the first mounting surface comprises a flanged bracket that is coupled to the cross car member, and the second mounting surface comprises a flanged bracket that is coupled to the object.

9. An assembly for a vehicle, comprising:
   an instrument panel having an interior surface of a passenger compartment of the vehicle;
   a rigid body element extending substantially parallel to the interior surface, from which extends a first mounting surface oriented substantially perpendicular to the interior surface, wherein the rigid body element includes a mounting bracket having the first mounting surface and an upper arm adapted to engage an upper region of the instrument panel;
   an object mounted to the interior surface so that at least a portion of the object is accessible from the passenger compartment of the vehicle; wherein at least one edge of the object touches an edge of the interior surface along at least one predetermined trim line;
   a bracket having a second mounting surface oriented substantially perpendicular to the interior surface and directly attached to the object so that the second mounting surface is positioned in an alignment zone relative to the first mounting surface; and
   a fastening mechanism attaching first mounting surface and second mounting surface and including a first aperture extending through one of the first mounting surface and second mounting surface in a position spaced from and below the rigid body member and the object, the first aperture being of a size larger than a required size to receive the fastening mechanism.

10. The assembly of claim 9, wherein the first aperture extends through the first mounting surface, a second aperture extends through the second mounting surface; and the fastening mechanism comprises a bolt that extends through the first and second apertures when the second mounting surface is in the alignment zone.

11. The assembly of claim 9, wherein the first aperture extends through the second mounting surface, a second aperture extends through the first mounting surface; and the fastening mechanism comprises a bolt that extends through the first and second apertures when the second mounting surface is in the alignment zone.

12. The assembly of claim 9, wherein the fastening mechanism comprises a stud extending from one of the first mounting surface and second mounting surface, the stud being sized to through the first aperture when the second mounting surface is in the alignment zone.

13. The assembly of claim 9, wherein the fastening mechanism comprises a nut and a threaded member, wherein the nut is secured to the threaded member with a torque that is below a predetermined value selected to permit the first and second mounting surfaces to move relative to each other when the object is struck in the vehicle during a collision.

14. The assembly of claim 9, wherein the object comprises one of a radio, HVAC controller, user-actuated switch, and navigation screen.

15. The assembly of claim 9, wherein the first and second mounting surfaces are in facing engagement when coupled by the fastening mechanism.

16. The assembly of claim 9, wherein the rigid body element comprises a cross car member, the first mounting surface comprises a flanged bracket that is coupled to the cross car member, and the second mounting surface comprises a flanged bracket that is coupled to the object.

17. An assembly for a vehicle, comprising:
- an instrument panel having an interior surface of a passenger compartment of the vehicle;
- a rigid body element extending substantially parallel to the interior surface, from which extends a first mounting surface oriented substantially perpendicular to the interior surface;
- an object mounted to the interior surface so that at least a portion of the object is accessible from the passenger compartment of the vehicle; wherein at least one edge of the object touches an edge of the interior surface along at least one predetermined trim line;
- a bezel attached to the instrument panel and having an opening to receive a portion of the object;
- a bracket having a second mounting surface oriented substantially perpendicular to the interior surface and directly attached to the object so that the second mounting surface is positioned in an alignment zone relative to the first mounting surface, wherein the bracket includes an upper arm configured to attach to an inside surface of the bezel; and
- a fastening mechanism attaching first mounting surface and second mounting surface and including a first aperture extending through one of the first mounting surface and second mounting surface in a position spaced from and below the rigid body member and the object, the first aperture being of a size larger than a required size to receive the fastening mechanism.

18. The assembly of claim 17, wherein the first aperture extends through the first mounting surface, a second aperture extends through the second mounting surface; and the fastening mechanism comprises a bolt that extends through the first and second apertures when the second mounting surface is in the alignment zone.

19. The assembly of claim 17, wherein the first aperture extends through the second mounting surface, a second aperture extends through the first mounting surface; and the fastening mechanism comprises a bolt that extends through the first and second apertures when the second mounting surface is in the alignment zone.

20. The assembly of claim 17, wherein the fastening mechanism comprises a stud extending from one of the first mounting surface and second mounting surface, the stud being sized to through the first aperture when the second mounting surface is in the alignment zone.

21. The assembly of claim 17, wherein the fastening mechanism comprises a nut and a threaded member, wherein the nut is secured to the threaded member with a torque that is below a predetermined value selected to permit the first and second mounting surfaces to move relative to each other when the object is struck in the vehicle during a collision.

22. The assembly of claim 17, wherein the object comprises one of a radio, HVAC controller, user-actuated switch, and navigation screen.

23. The assembly of claim 17, wherein the first and second mounting surfaces are in facing engagement when coupled by the fastening mechanism.

24. The assembly of claim 17, wherein the rigid body element comprises a cross car member, the first mounting surface comprises a flanged bracket that is coupled to the cross car member, and the second mounting surface comprises a flanged bracket that is coupled to the object.

* * * * *